April 27, 1954

D. E. ROSS ET AL 2,676,766

REMOVABLE MAGAZINE FOR TAPE

Filed Jan. 4, 1947

3 Sheets-Sheet 1

DONALD E. ROSS,
HERMAN S. HELLER,
INVENTORS.

BY [signature]

ATTORNEY.

DONALD E. ROSS,
HERMAN S. HELLER,
INVENTORS.

BY [signature]
ATTORNEY.

April 27, 1954 D. E. ROSS ET AL 2,676,766

REMOVABLE MAGAZINE FOR TAPE

Filed Jan. 4, 1947 3 Sheets-Sheet 3

DONALD E. ROSS,
HERMAN S. HELLER,
INVENTORS.

BY [signature]
ATTORNEY.

Patented Apr. 27, 1954 2,676,766

UNITED STATES PATENT OFFICE 2,676,766

REMOVABLE MAGAZINE FOR TAPE

Donald E. Ross, Eau Gallie, Fla., and Herman S. Heller, Los Angeles, Calif.; said Ross assignor to said Heller Application January 4, 1947, Serial No. 720,217

3 Claims. (Cl. 242—76)

This invention relates generally to containers of the magazine type adapted to contain a long length of web or tape, and more particularly to such magazines which may be used with devices for the recording and reproducing of sound, or with any other device where it is desired to have supply and take-up reels, driving means, and guiding means for the tape permanently located within a magazine which is readily removable from the remainder of the equipment.

Wherever it is necessary to handle long lengths of a relatively thin and narrow tape, it is generally desirable to wind this tape upon a reel from which it may be transferred to a take-up reel when it is to be used. In the case of magnetic sound recording and reproducing equipment, the recording medium used is a very thin ferro-magnetic tape or wire which is quite narrow but very long. It is desirable that this tape be readily replaceable so that any desired selection may be reproduced, as with the disc type phonograph records, or, if the device is being used as a dictation machine, so that the tape may be removed as soon as the record is filled, and transcription may be started while further dictation continues. In order to simplify the operation of such devices, it is desirable to have the reels, the tape or web, and the driving members for the latter all permanently mounted within a magazine. This requires that coupling means be provided for the reels and the driving mechanisms to operate them, and this in turn requires an accurate alinement of the magazine with the remainder of the device.

It is therefore the major object of the invention to provide a removable magazine adapted to contain a web or tape, adapted to be quickly and easily installed or removed from a device intended to receive it.

Another object of the invention is to provide such a magazine in which the tape is maintained under the proper uniform tension at all times while the device is in operation.

It is a further object of the invention to provide a separable drive connection adapted to connect the shafts of the reels and driving mechanism to corresponding shafts of the associated device.

Still another object of the invention is to provide such a magazine which is simple and compact, yet in which the web or tape is definitely and positively located with respect to the using device when the magazine is installed thereon.

It is a still further object of the invention to provide a magazine of this type which is rugged and sturdy in construction but which is so designed that it may be easily and economically manufactured in large quantities.

These and other objects and advantages of the invention will become apparent from the following description of a preferred form thereof, and from the drawings illustrating that form in which.

Figure 1:
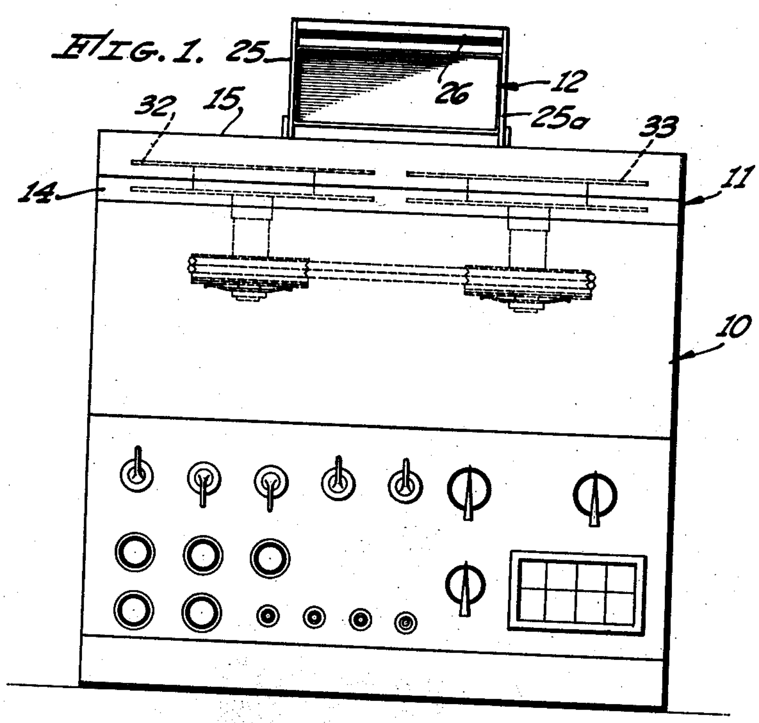
Figure 1 is a front elevational view of one form of a device which may advantageously make use of this improved magazine, herein shown as a magnetic type sound recorder and reproducer.

It will be realized that this magazine is suitable for use with any device wherein a length of web or tape is moved past a fixed point on the device, such as the aperture of a camera or the recording or reproducing head of a sound translation device. While the magazine is equally suitable for use in motion picture cameras, it is particularly adapted for use with magnetic recorders and reproducers, and it is this latter device which has been illustrated in the drawings. As shown therein, the numeral 10 indicates a housing containing the driving motor, control circuits, and various other elements associated with such a device. The housing 10 is adapted to receive a magazine 11 on its upper surface, and a pivoted handle 12 is mounted on the housing to lock or release the magazine. Normally, the operation of the handle 12 will also operate certain other elements associated with the housing 10 such as a film gate or magnetic recording, reproducing, or erasing electro-magnets, but since these elements are a part of or associated with the housing 10, they form no part of the magazine 11 and hence are not described herein.

The magazine 11 includes a base member 13 in the form of a plate having upturned edges 14 which are adapted to receive a cover 15, thereby providing a complete enclosure for the elements contained within the magazine. To provide the necessary rigidity for the container thus formed, a stiffener 16 is mounted within the magazine on the base 13, and the latter is adapted to rest upon an upper wall 17 of the housing 10. It will be noted that a notch or re-entrant portion 20 is formed near the handle 12, and this is adapted to receive the magnetic recording, reproducing and erasing elements which are mounted on the housing 10.

Figures 6, 12, 13:
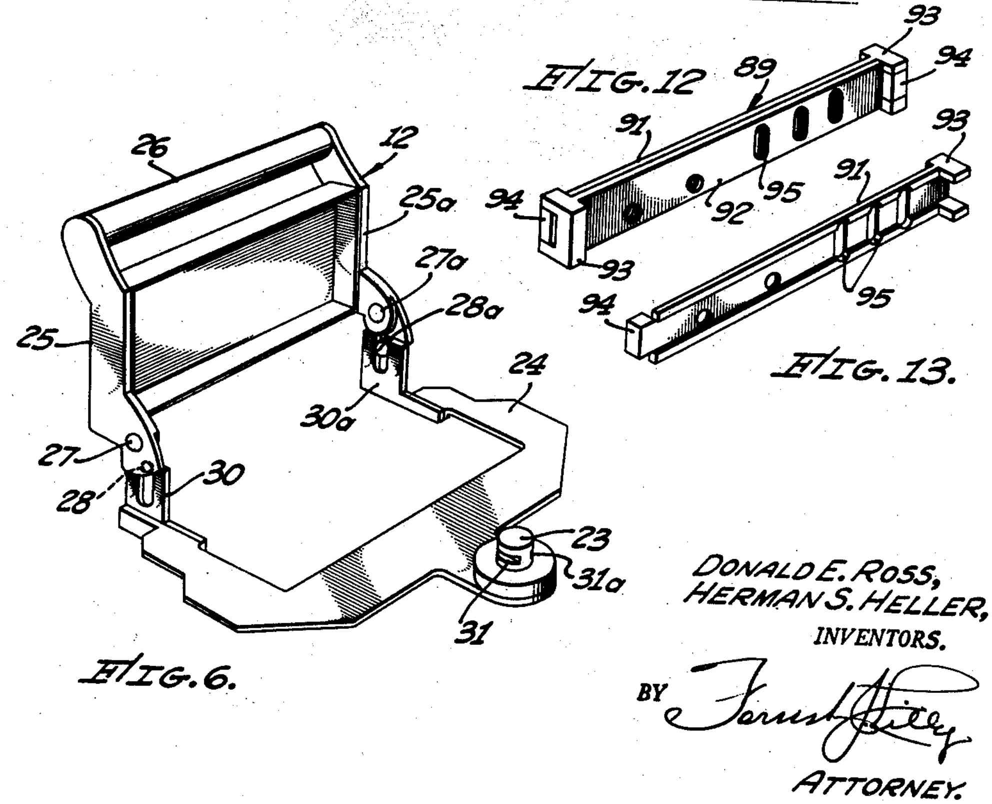
Figure 6 is a perspective view of the handle and operating mechanism associated therewith to release and lock the magazine.
Figure 12 is a perspective view of the tape guide assembly used with the magazine.
Figure 13 is a perspective view of one of the guide members used in the tape guide assembly.
Figure 2:
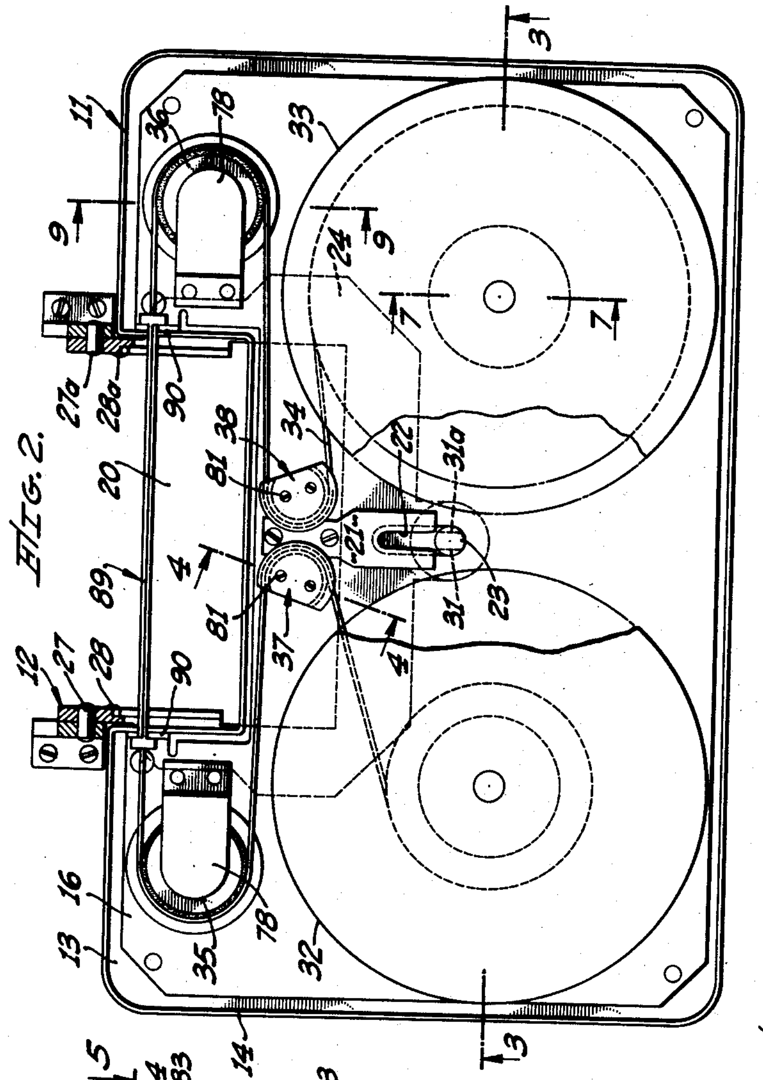
Figure 2 is a plan view of the magazine with the cover removed.
Figure 3:
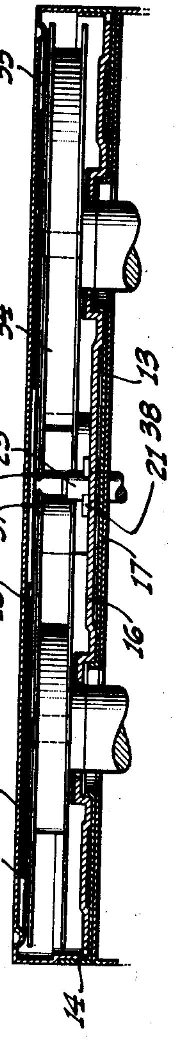
Figure 3 is a cross-sectional view of the magazine taken at 3—3 in Figure 2.

Centrally located with respect to the magazine 11 and extending forwardly from the notch 20 is a latch plate 21 having a slot 22 formed therein to receive a bolt 23. As shown in Figure 6, the bolt 23 is mounted on a yoke 24 which is operated by the handle 12, and the bolt and yoke are slidably supported in the housing 10 so that they may be moved forwardly and rearwardly with respect to the latter by raising and lowering the handle. The handle 12 preferably consists of a pair of pivoted arms 25 and 25$a$ which are joined at their outer ends by a hand grip 26, and which are pivotally supported at points 27 and 27$a$ by the housing 10. The opposite ends of the arms 25 and 25$a$ extend a slight distance beyond the pivot points 27 and 27$a$ and are provided with pins 28 and 28$a$, of which only pin 28$a$ is visible, to engage bifurcated ends 30 and 30$a$ of the yoke 24. With the handle 12 in the raised position shown in Figure 6, the yoke 24 is in its most forwardly position, but as the handle is lowered, pins 28 and 28$a$ are moved rearwardly about the and pivots 27 and 27$a$, carrying with them yoke 24 and bolt 23. Bolt 23 is provided with horizontally disposed lateral slots 31 and 31$a$ adjacent its upper end, and these slots are adapted to receive the tines of the bifurcated latch plate 21, the shank of the bolt fitting into the slot 22 as the bolt is moved rearwardly. When the handle 12 is raised, the bolt 23 is moved forwardly to disengage the latch plate 21, and the magazine 11 may then be removed from the housing 10.

Within the magazine 11 are a pair of reels 32 and 33 which are located in the forward portion of the magazine and are adapted to have a tape 34 wound thereon. Near the rear of the magazine 11 are a pair of drive rollers 35 and 36 so located that tape passing tangentially between their rear surfaces will extend across the notch or re-entrant portion 20, and adjacent the latch plate 21 and forward of the notch are a pair of frictional guide blocks 37 and 38, hereinafter described in greater detail, over which the tape 34 is passed. These friction blocks provide a frictional restraint on the tape 34 to prevent irregular and erratic movement of the latter, and the tape passes from reel 32, over friction block 37, around drive roller 35 and across the notch 20 to drive roller 36, from whence it passes over friction block 28 and is then wound upon reel 33.

Figure 7:
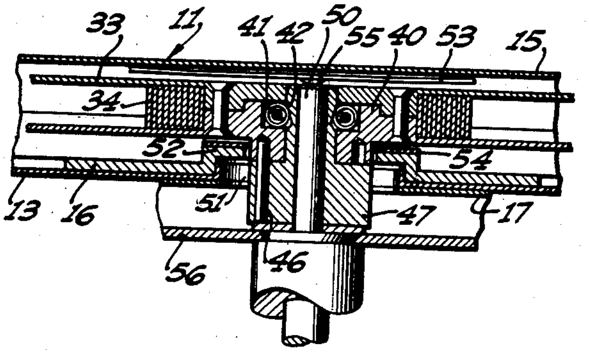
Figure 7 is a cross-sectional view of a reel taken at 7—7 in Figure 2 and showing the separable connection in cross-section.

To drive the reels 32 and 33, each reel is provided with a hub 40, shown in detail in Figure 7, and fitted with a so-called "garter" spring mounted with an annular recess 39 which secures it against accidental movement while permitting it to engage an associated driving shaft 43. A groove or notch 42 is formed in the shaft 43 and is generally triangular in cross-section, with its upper surface formed at an angle such that compression of the garter spring 41 will tend to urge the hub 40 downwardly. The lower face of the hub is provided near its outer edge with a series of circumferentially spaced vertical holes 45 which are adapted to receive a vertical pin 46 extending upwardly from a collar 47, located near the upper end of shaft 43, and either formed integral with the latter or formed separately and held to the shaft for rotation therewith. The upper face of the collar 47 acts as a stop to limit the downward movement of the hub 40, and the pin 46, which extends upwardly into a hole 45 as previously described, rotates with the collar to provide a positive drive for the reel 33. As shown in Figure 7 the shaft 43 may have an axial bore in which a drive rod 50 is mounted, but this is for convenience in manufacturing only, and the shaft and rod may be formed as a single unit if desired.

Figure 8:
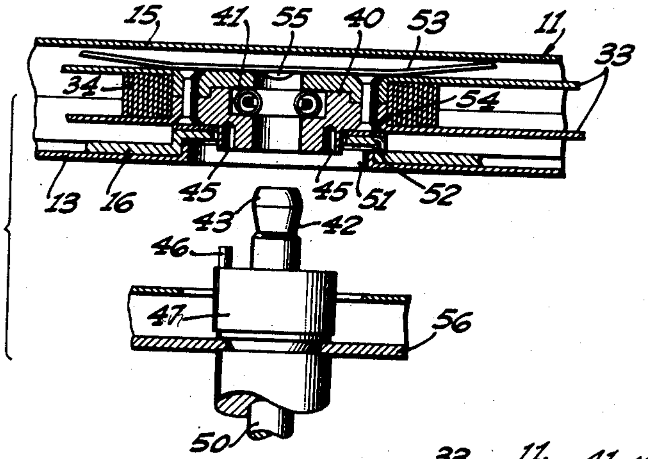
Figure 8 is a view of the reel and coupling shown in Figure 7 but with the reel separated from the coupling and with the latter shown in elevation.

From the foregoing, it will be seen that the reel 33 is releasably held on the shaft 43 by the action of the garter spring 41, and is positively driven by the pin 46 mounted in the rotating collar 47. In addition, the constricting action of the garter spring 41 urges the reel 33 and its hub 40 downwardly so that the latter bears against the upper surface of the collar 47. The vertical position of the reel 33 when mounted on the shaft 43 is thus determined by the upper surface of the collar 47, and this position is preferably one where the reel is held above the stiffening plate 16 so that there is no friction between the two. It will be noted that the base 13 of the magazine 11 is provided wtih an aperture 51 to receive the collar 47, and the stiffening plate 16 is provided with a corresponding aperture and an offset 52 which is adapted to receive the hub 40 of the reel and limit its downward travel. A leaf spring 53 is placed between the upper surface of the reel 33 and the top 15 of the magazine 11 to urge the reel downwardly to bear against the offset 52 or a frictional surface 54 placed thereon. However, when the reel 33 is placed upon the shaft 43, the central portion of the shaft bears against a protuberance 55 on the spring 53 to force the spring upwardly and disengage it from the reel. The relative position of these various members when the reel is mounted on the shaft is shown in Figure 7, and their relative positions when the reel is removed therefrom is shown in Figure 8. In the latter view, it will be noted that the leaf spring 53 bears against the upper surface of the hub 40 to urge it downwardly so that its lower surface rests against the frictional surface 54 on the offset 52. The frictional resistance thus provided prevents the turning or rotation of the reel when the magazine 11 is removed from the housing 10, and the offsets 52 bear against the lower surface of the outer portion of the hub 40 to hold the latter in its proper horizontal position.

The upper end of the shaft 43 is preferably tapered a slight amount to facilitate its insertion into the hub 40, and the lower end of the shaft extends downwardly into the housing 10 where it is supported in any suitable manner as by a plate 56. The shaft 43 is provided with a pulley at its lower end, and an overrunning torque limiting clutch is interposed between the pulley and the shaft so that the latter is driven in only one direction, and the torque exerted upon it is maintained at a value less than that which would tend to break or snap the tape 34. Reel 32 is mounted and driven in a manner similar to reel 33 with the exception that the direction of drive for reel 32 is opposite to that for reel 33. Thus, when reel 33 is driven in a clockwise rotation by shaft 43, reel 32 will be driven only by the removal of tape 34 therefrom, and not by its shaft. Conversely, when reel 32 is driven in a counterclockwise direction by its shaft, reel 33 is driven by the removal of tape 34, receiving no rotational energy from shaft 43 during this period.

Figure 11:
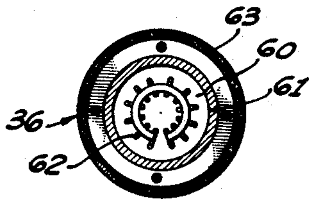
Figure 11 is a cross-sectional view of the drive roller taken at 11—11 in Figure 10.
Figure 10:
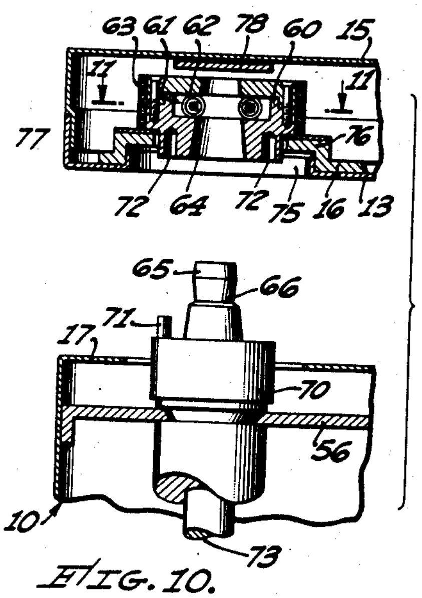
Figure 10 is a view similar to Figure 9 but with the magazine separated from the device, and with a portion of the separable drive shown in elevation.
Figure 9:
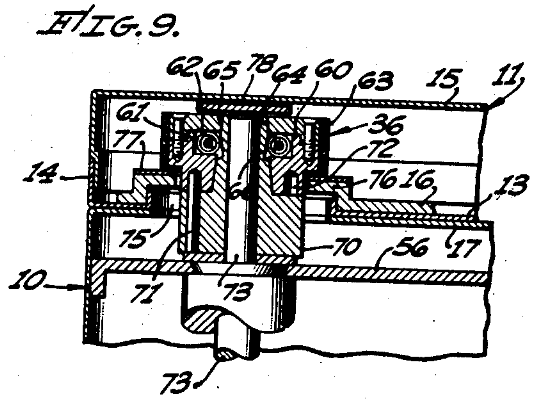
Figure 9 is a cross-sectional view of a drive roller taken at 9—9 in Figure 2, showing the roller and driving connections engaged, with these latter elements in cross-section.

The drive rollers 35 and 36 are substantially identical, and are provided with separable drive couplings similar to those provided for the reels 32 and 33. As illustrated in Figures 9, 10 and 11, the drive roller 36 is provided with a hub portion 60, preferably of a two-piece construction for ease in manufacture, and a central annular space 61 is provided to receive a garter spring 62 similar to the garter spring 41. A belt or surface 63 of a material having a high coefficient of friction, such as rubber, is placed on the peripheral surface of the drive roller 36 to engage and drive the tape 34 which passes around this roller.

The hub 60 is provided with an axial bore 64 adapted to receive a drive shaft 65, the hole and shaft both being provided with a taper to give them a generally conical shape and insure a tight fit. An annular notch or recess 66 is formed in the shaft 65 to receive the garter spring 62, and the action of the latter on the notch is similar to that of garter spring 41 on notch 42 of the shaft 43, urging the drive roller 36 downwardly with respect to the shaft 65.

The lower surface of the hub 60 is adapted to bear against a collar 70 mounted on the shaft 65 below the hub and provided with an upwardly extending pin 71 which is adapted to fit into one of a series of holes 72 formed in the lower surface of the hub 60. The holes 72 extend upwardly from the lower surface of the hub and are spaced around the periphery of the latter so that only a very slight rotation of the drive roller 36 is necessary to aline one of the holes with the pin 71. As in the separable coupling used for reels 32 and 33, a core rod or shaft 73 may be provided on which the shaft 65 and collar 70 are mounted, and this drive shaft may be supported by the support plate 56 mounted in housing 10.

The shaft 65, or optionally the core shaft 73, is provided with a pulley (not shown) at its lower end having an overrunning clutch to connect the pulley and shaft so that the latter is driven when the pulley is rotated in one direction, but is not driven by the pulley when the latter is rotated in the opposite direction. Such arrangements are known in the art.

As in the case of the reels 32 and 33, the base 13 and the stiffening plate 16 of the magazine 11 are provided with apertures 75 through which the shaft 65 and collar 70 may extend to engage the drive rollers 35 and 36. The stiffening plate 16 is provided with offsets 76 adjacent these apertures, and a friction surface 77 is placed on the upper portion of the offset to support the roller when the shaft 65 is removed therefrom, as shown in Figure 10. It will be noted that the lower portion of the hub 60 extends downwardly through the apertures 75 surrounded by the offset 76 so that the latter will limit the horizontal movement of the drive roller and maintain it in substantially correct position for engagement with the shaft 65. A bearing plate 78 is preferably attached to the under surface of the top 15 of the magazine 11 so that the drive roller 36 may not be moved upwardly to a point where the lower surface of the hub 60 is above the friction surface 77, and hence the roller may not be moved out of its desired horizontal position. The roller 36 thus "floats" within the magazine 11, and when the magazine is placed upon the housing 10, the shaft 65 will first urge the roller 36 upwardly against the bearing plate 78 until such time as garter spring 62 enters the notch 66, whereupon the roller will be urged downwardly to bear against the collar 70. In this position, the roller 36 is spaced a slight distance downwardly from the bearing plate 78, and is also held a slight distance above the friction surface 77, the roller thus being completely free from any rubbing contact with the magazine 11.

When the magazine is removed from the drive unit 10, the various elements assume the position shown in Figure 10, with the roller 36 resting upon the friction surface 77 on the offset 76. If the magazine 11 is turned upside down, the roller will move toward the bearing plate 78 and rest against the latter, but the lower portion of the hub 60 will still extend at least partially through the aperture surrounded by the offset 76, and horizontal movement of the roller is restrained as previously described. A cross-sectional view of the drive roller 36 is shown in Figure 11.

With the parts heretofore described, it is possible to form a completely operable magazine in which the tape 34 is removed from one reel for example, reel 32, passed directly over drive roller 35 and across the notch 20 to drive roller 36, from whence it would go directly to reel 33. However, to prevent the torque of the take-up reel 33 from being transmitted directly to the tape which passes over drive roller 36, thus permitting the take-up reel instead of the drive roller to determine the speed of the tape through the notch 20, it has been found desirable to install frictional guide blocks 37 and 38 in the path of the tape 34 so that the tension in the tape caused by the rotation of take-up reel 33 is not transmitted to the tape passing over the drive roller 36, and similarly the tension caused by the rotation of the drive roller 36 is not transmitted to the supply reel 32 but instead is directed against the friction block 37.

Figure 4:
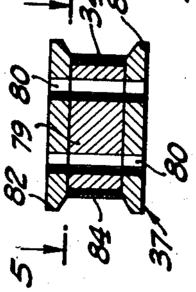
Figure 4 is a cross sectional view of a guide block for the tape, taken at 4—4 in Figure 2.
Figure 5:
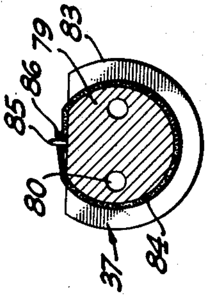
Figure 5 is a plan view of a section of the guide block shown in Figure 4 and taken at 5—5 therein.

As shown in Figures 4 and 5, the block 37 is generally cylindrical in shape and has a cross-sectional area which is substantially that of a segment of a circle. The friction block 37 consists essentially of a core member 79 formed in the shape mentioned and provided with vertical holes 80 extending therethrough to receive holding means such as screws 81 extending into the stiffener plate 16. Horizontal flanges 82 and 83 are provided at the upper and lower ends of the friction block 37, and the inside faces of these flanges are formed at an angle so that a tape 34 will be urged toward the center of the groove formed by the flanges. In the bottom of the groove thus formed is a wiping or cleaning member 84 preferably in the form of a knitted or woven member which is adapted to bear against the tape and wipe the latter as it passes over the friction block 37, while at the same time providing a frictional drag on the tape without wearing the latter. To hold the wiping member 84 on the friction block 37, a projection or pin 85 extends outwardly from the flat surface of core member 79, and the ends of the wiping member are provided with holes 86 which may be slipped over the pin to secure the wiper. Replacement of the wiping member 84 is thus a simple matter when it becomes worn or dirty. By mounting the friction blocks 37 and 38 on or adjacent the latch plate 21, and thus between the reels 32 and 33, the tape 34 may be caused to follow a sinuous path in its passage from one reel to the other. This path insures that the tape 34 will bear against the wiping member 84 through a sufficient arc to provide such frictional engagement between the two that a form of snubbing action is effected. Consequently, when the reels 32 and 33 and the drive rollers 35 and 36 are driven to transfer the tape 34 from reel 32 to reel 33, the tension in the tape produced by the rotation of drive roller 36 will not be transmitted to that portion of the tape between friction block 37 and reel 32. As a result, the supply reel 32 is rotated at a speed fast enough to supply the tape 34 at the desired linear speed, and the only tension in the tape between the friction block 37 and the supply reel is that necessary to rotate the latter. In a similar manner, the tension in the tape 34 between the take-up reel 33 and the friction block 38 is not transmitted to the remainder of the tape and hence there is no tendency for the drive roller 36 to be driven by the tape instead of by the pulley attached to the lower end of shaft 65.

In the recording of sound on a tape such as this, it is essential that the tape be accurately alined with the corresponding recording, reproducing, and erasing electromagnets (not shown) which will normally fit into the notch 20 of the magazine 11. This requirement of alinement is very rigorous if the recording is done in a series of laterally displaced lanes extending longitudinally along the tape, since any slight misalinement can cause cross-talk or complete non-intelligibility of any recording. The problem has been solved in the present invention by providing a tape guide assembly 89, shown in Figure 12, which extends across the notch or re-entrant portion 20, with its ends fitting into tabs 90 formed in the stiffener 16. The tape 34 extends the length of the guide assembly 89, passing through its center, and the assembly is accurately positioned with respect to the recording and other electromagnets by alinement members (not shown) mounted on the housing 10. The guide assembly 89 comprises two similar members 91 and 92, preferably formed of brass or other relatively soft non-magnetic material, with hardened lugs 93 and 94 attached to the ends. As indicated in Figures 12 and 13, lug 94 is designed to fit within lug 93, and by placing one type of lug on one end of a guide member, and the other type on the other end, two guide members may be combined to form the assembly shown in Figure 12. Apertures 95 are formed in the assembly to provide for access of the electromagnets to the tape 34. To insure that the tape guide assembly 89, and the magazine 11 are properly alined with respect to the housing 10, alinement studs 96 are mounted on the housing to extend into the magazine, near the notch 20, thus accurately positioning the magazine and preventing lateral shocks from being transmitted from it to the different drive shafts and couplings.

In the operation of a recorder using this removable magazine, the magazine is placed in operative position by raising the handle 12 and alining the magazine so that the various drive couplings for reels 32 and 33, and drive rollers 35 and 36 are alined with the corresponding couplings mounted in the housing 10, and the entire magazine assembly is then forced downwardly to engage these couplings. As this is done, the bolt 23 enters the slotted opening in the bottom of magazine 11, and the alinement studs 96 likewise move into the magazine. The handle 12 is then rotated to a horizontal position, and bolt 23 is moved rearwardly to enter the notch 22 of latch plate 21, the fingers of which fit into the slots 31 and 31a and hold the magazine against accidental removal. When the drive unit located within the housing 10 is operated, tape is transferred from one to the other of the reels 32 and 33, and back again until all desired recording and erasing has been done. The magazine may then be removed from the housing 10 by raising the handle 12, thereby moving the bolt 23 forward to disengage it from the latch plate 21, and permitting the magazine to be lifted upwardly so that the various separable couplings for the reels 32 and 33 and the drive rollers 35 and 36 are disconnected. A different magazine 11 may then be substituted for the magazine just removed, and the new magazine connected to the housing 10 in a manner similar to that just described.

The magazine described is thus quickly and easily attached and detached from the housing 10, and has a minimum of parts necessary for the operations to be performed. It is sturdy, light in weight, and may be inexpensively manufactured in large quantities. The alinement of the tape is insured by the provision of the guide assembly members 91 and 92 which are mounted on the housing 10, and thus a simple and completely serviceable device is provided. While a preferred form of the device has been shown and described, it will be apparent that modifications may be made therein without departing from the spirit of the invention as herein defined, and the latter is not to be limited to the particular form or arrangement of parts herein described and shown or covered by the following claims.

We claim:

1. A tape guide assembly which includes: a pair of relatively long and narrow tape guides; a first lug mounted on the end of one of said tape guides; and a second lug mounted on the end of the other of said guides, said second lug being shaped to fit into said first lug, with said first and said second lug mounted on opposite ends of each of said tape guides, whereby said pair of guides may be interfitted into each other.

2. A tape guide assembly which includes: a pair of relatively long and narrow guide members of a relatively soft material; a first lug of a relatively hard material, mounted on one end of each of said guide members; and a second lug of a relatively hard material mounted on the remaining end of each of said guide members, said second lugs being shaped to fit into said first lugs, whereby said guide members and lugs may be interfitted into each other to provide an open-ended channel for said tape.

3. A magazine for tape adapted to be removably attached to a drive unit and including: a housing; means within said housing to drive said tape; supply and take-up reels for said tape mounted within said housing; a pair of relatively long and narrow guide members of a relatively soft material; a first lug of a relatively hard material, mounted on one end of each of said guide members; a second lug of a relatively hard material mounted on the remaining end of each of said guide members, said second lug being shaped to fit into said first lug, whereby said guide members and lugs may be interfitted into each other to provide an open-ended channel for said tape; and means for attaching said guide members to said housing.

References Cited in the file of this patent

UNITED STATES PATENTS

| Number | Name | Date |
|---|---|---|
| 1,694,111 | Wellman | Dec. 4, 1928 |
| 2,190,081 | Pfauser | Feb. 13, 1940 |
| 2,269,170 | Allenby | Jan. 6, 1942 |
| 2,297,525 | Anheuser | Sept. 29, 1942 |
| 2,319,530 | Bolsey | May 18, 1943 |
| 2,321,812 | Heller et al. | June 15, 1943 |
| 2,349,018 | Tasker | May 16, 1944 |
| 2,362,019 | Moore | Nov. 7, 1944 |
| 2,364,556 | Somers | Dec. 5, 1944 |
| 2,468,198 | Heller | Apr. 26, 1949 |